United States Patent
McKeown et al.

(10) Patent No.: US 7,366,711 B1
(45) Date of Patent: Apr. 29, 2008

(54) MULTI-DOCUMENT SUMMARIZATION SYSTEM AND METHOD

(75) Inventors: Kathleen R. McKeown, Wayne, NJ (US); Regina Barzilay, New York, NY (US)

(73) Assignee: The Trustees of Columbia University in the city of New York, New York, NY (US)

( * ) Notice: Subject to any disclaimer, the term of this patent is extended or adjusted under 35 U.S.C. 154(b) by 0 days.

(21) Appl. No.: 09/913,745

(22) PCT Filed: Feb. 18, 2000

(86) PCT No.: PCT/US00/04118

§ 371 (c)(1),
(2), (4) Date: Dec. 10, 2001

(87) PCT Pub. No.: WO00/49517

PCT Pub. Date: Aug. 24, 2000

Related U.S. Application Data

(60) Provisional application No. 60/120,659, filed on Feb. 19, 1999.

(51) Int. Cl.
*G06F 17/30* (2006.01)
(52) U.S. Cl. ............... 707/3; 707/5; 707/101; 715/731
(58) Field of Classification Search ............ 707/3, 707/4, 5, 6, 10, 101; 704/9; 715/526, 530, 715/540, 531
See application file for complete search history.

(56) References Cited

U.S. PATENT DOCUMENTS

| | | | |
|---|---|---|---|
| 4,965,763 A | 10/1990 | Zamora | |
| 5,077,668 A | 12/1991 | Doi | |
| 5,297,027 A | 3/1994 | Morimoto et al. | |
| 5,384,703 A | 1/1995 | Withgott et al. | |
| 5,638,543 A | 6/1997 | Pedersen et al. | |
| 5,689,716 A | 11/1997 | Chen et al. | |
| 5,778,397 A * | 7/1998 | Kupiec et al. | 715/500 |
| 5,838,323 A * | 11/1998 | Rose et al. | 715/526 |
| 5,848,191 A | 12/1998 | Chen et al. | |
| 5,907,841 A * | 5/1999 | Sumita et al. | 707/6 |
| 5,924,108 A | 7/1999 | Fein et al. | |
| 6,098,034 A * | 8/2000 | Razin et al. | 704/9 |
| 6,205,456 B1 * | 3/2001 | Nakao | 715/531 |
| 6,295,529 B1 * | 9/2001 | Corston-Oliver et al. | 707/3 |

(Continued)

OTHER PUBLICATIONS

"A Fast and Portable Realizer for Text Generation Systems", Benoit Lavoie and Owen Rambow; In Proceedings of th Fifth Conference on Applied Natural Language Processing (ANLP97), Washington, 1997, pp. 265-268. ACL.

(Continued)

*Primary Examiner*—Jean M. Corrielus
(74) *Attorney, Agent, or Firm*—Baker Botts L.L.P.

(57) ABSTRACT

A summary for a collection of related documents can be generated by extracting phrases from the documents which include common focus elements. Phrase intersection analysis is then performed on the extracted phrases to generate a phrase intersection table, where identical or equivalent phrases are identified. Temporal processing on the phrases in the phrase intersection table is performed to remove ambiguous time references and to sort the phrases in a temporal sequence. Sentence generation is then used to combine the phrases in the phrase intersection table into a coherent summary.

22 Claims, 5 Drawing Sheets

U.S. PATENT DOCUMENTS

| | | | |
|---|---|---|---|
| 6,353,824 B1 * | 3/2002 | Boguraev et al. | 707/5 |
| 6,363,377 B1 * | 3/2002 | Kravets et al. | 707/4 |
| 6,470,307 B1 * | 10/2002 | Turney | 704/9 |
| 6,529,889 B1 * | 3/2003 | Bromberg et al. | 706/45 |
| 6,553,373 B2 * | 4/2003 | Boguraev et al. | 707/5 |
| 6,581,057 B1 * | 6/2003 | Witbrock et al. | 707/5 |
| 6,823,333 B2 * | 11/2004 | McGreevy | 707/4 |
| 6,865,572 B2 * | 3/2005 | Boguraev et al. | 707/5 |
| 7,162,413 B1 * | 1/2007 | Johnson et al. | 704/9 |

OTHER PUBLICATIONS

"A Framework for MT and Multilingual NLG Systems Based on Uniform Lexico-Structural Processing"; Benoit Lavoie, Richard Kittredge, Tanya Korelsky and Owen Rambow, ANLP/NAACL 2000.

"A Framework for MT and Multilingual NLG Systems Based on Uniform Lexico-Structural Processing"; Benoit Lavoie, Richard Kittredge, Tanya Korelsky and Owen Rambow.

Mani et al., "Multi-document summarization by graph search and matching," Database Compendex (Online), Engineering Information, Inc., New York, NY, US, Database Accession No. EIX98354279423, XP002384478, 1997.

McKeown et al., "Generating Summaries of Multiple News Articles," SIGIR '95. Proceedings of the 18th Annual International ACM SIGIR Conference on Research and Development in Information Retrieval, Seattle, Jul. 9-13, 1995, pp. 74-82.

* cited by examiner

MULTI-DOCUMENT SUMMARIZATION SYSTEM AND METHOD

STATEMENT OF RELATED APPLICATIONS

This application claims the benefit of U.S. provisional patent application Ser. No. 60/120,659, entitled "Information Fusion in the Context of Multi-Document Summarization," which was filed on Feb. 19, 1999.

STATEMENT OF GOVERNMENT RIGHTS

The United States Government may have certain rights to the invention set forth herein pursuant to a grant by the National Science Foundation, Contract No. IRI-96-18797.

FIELD OF THE INVENTION

The present invention relates generally to information summarization and more particularly relates to systems and methods for generating a summary for a set of multiple, related documents.

BACKGROUND OF THE INVENTION

The amount of information available today drastically exceeds that of any time in history. With the continuing expansion of the Internet, this trend will likely continue well into the future. Often, people conducting research of a topic are faced with information overload as the number of potentially relevant documents exceeds the researchers ability to individually review each document. To address this problem, information summaries are often relied on by researchers to quickly evaluate a document to determine if it is truly relevant to the problem at hand.

Given the vast collection of documents available, there is interest in developing and improving the systems and methods used to summarize information content. For individual documents, domain-dependent template based systems and domain-independent sentence extraction methods are known. Such known systems can provide a reasonable summary of a single document. However, these systems are not able to compare and contrast related documents in a document set to provide a summary of the collection.

The ability to summarize collections of documents containing related information is desirable to further expedite the research process. For example, for a researcher interested in news stories regarding a certain event, a summary of all documents from a given source, or multiple sources, would provide a valuable overview of the documents within the set. From such a summary, the researcher may be able to extract the information desired, or at the very least, make an informed decision regarding the relevance of the set of documents. Therefore, there remains a need for systems and methods which can generate a summary of related documents in a document set.

SUMMARY OF THE INVENTION

It is an object of the present invention to provide a system and method for generating a summary of a set of multiple, related documents.

It is a further object of the present invention to provide a system and method for generating a summary of a set of multiple, related documents which use paraphrasing rules to detect similarities in non-identical phrases in the documents.

A present method for generating a summary of related documents in a collection includes extracting phrases from the documents which have common focus elements. Phrase intersection analysis is performed on the extracted phrases to generate a phrase intersection table. Temporal processing can be performed on the phrases in the phrase intersection table to remove ambiguous temporal references and to sort the phrases in a temporal sequence. Sentence generation is performed using the phrases in the phrase intersection table to generate the multidocument summary.

Preferably, the phrase intersection analysis operation can include representing the phrases in tree structures having root nodes and children nodes; selecting those tree structures with verb root nodes; comparing the selected root nodes to the other root nodes to identify identical nodes; applying paraphrasing rules to non-identical root nodes to determine if non identical nodes are equivalent; and evaluating the children nodes of those tree structures where the parent nodes are identical or equivalent. The tree structure can take the form of a DSYNT tree structure. The paraphrasing rules can include one or more rules which are selected from the group consisting of ordering of sentence components, main clause versus a relative clause, different syntactic categories, change in grammatical features, omission of an empty head, transformation of one part of speech to another, and semantically related words.

In an embodiment of the present method, the temporal processing includes time stamping phrases based on a first occurrence of the phrase in the collection; substituting date certain references for ambiguous temporal references; ordering the phrases based on the time stamp; and inserting a temporal marker if a temporal gap between phrases exceeds a threshold value.

Preferably, a phrase divergence processing operation can also be performed to include phrases that signal changes in focus of the documents in the collection.

Sentence generation can includes mapping the phrases, represented in the tree structure, to an input format of a language generation engine and then operating the language generation engine.

A present system for generating a summary of a collection of related documents includes a storage device for storing the documents in the collection, a lexical database, such as WordNet, and a processing subsystem operatively coupled to the storage device and the lexical database. The processing subsystem is programmed to perform multiple document summarization including: accessing the documents in the storage device; using the lexical database to extract phrases from the documents with similar focus elements; performing phrase intersection analysis on the extracted phrases to generate a phrase intersection table; performing temporal processing on the phrases in the phrase intersection table; and performing sentence generation using the phrases in the phrase intersection table.

The methods described above can be encoded in the form of a computer program stored in computer readable media, such as CD-ROM, magnetic storage and the like.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
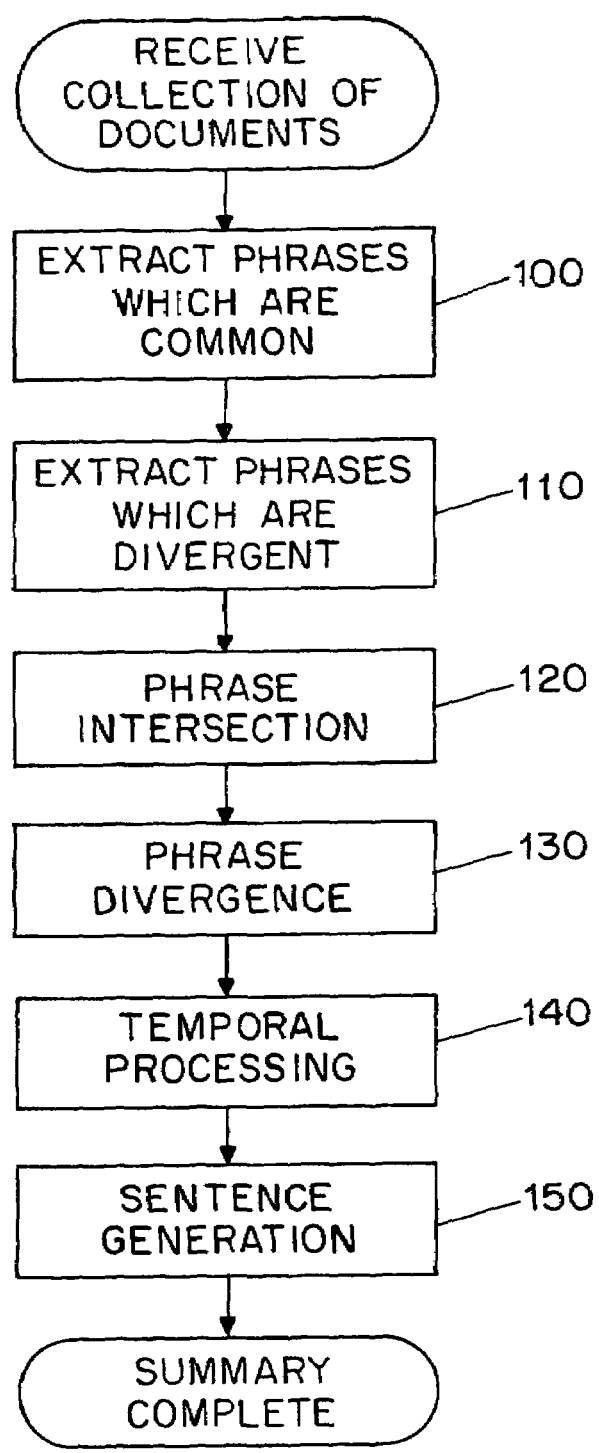
FIG. 1 is a flow chart illustrating the operation of the present multiple document summarization system.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

FIG. 1 is a flow chart which provides an overview of the operation of the present multiple document summarization system. Initially, a set of documents, in computer readable format and grouped by a common theme or domain, is presented to the summarization system. From the collection of documents, entities are identified and sentences are extracted from the documents which are relevant to the focus of the articles. Entities can be identified and extracted in a number of ways, such as by use of an information extraction engine. A suitable information extraction engine is TALENT, which is available from International Business Machines, Inc. In step 100, phrases are extracted from the documents which include terms that are present in at least two of the documents. In addition, divergent phrases, which may be indicative of contrasts in the documents, are also extracted from the document in step 110. Following extraction, phrase intersection processing (step 120) and phrase divergence processing (step 130) are performed to evaluate and compare the extracted phrases and determine whether such phrases should be included in the resulting multiple document summary. Since phrases are extracted from multiple documents and can include temporal references which are ambiguous when taken out of context from the original document, temporal processing (step 140) is performed on the phrases selected for the summary. Finally, sentence generation (step 150) is used to transform selected phrases into a coherent summary.

Figure 2:
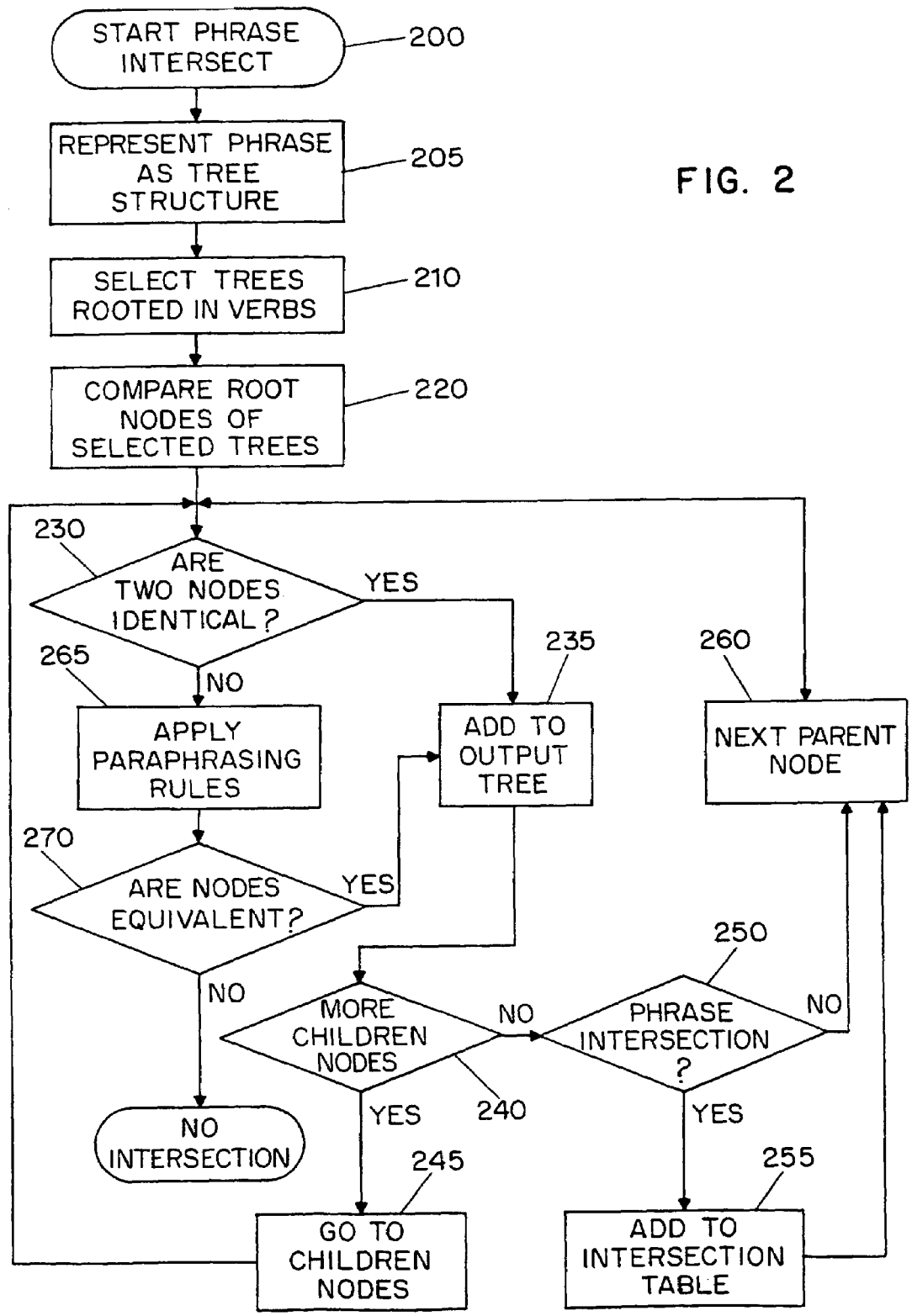
FIG. 2 is a flow chart of a phrase intersection processing operation in accordance with the system operation of FIG. 1.
Figure 3:
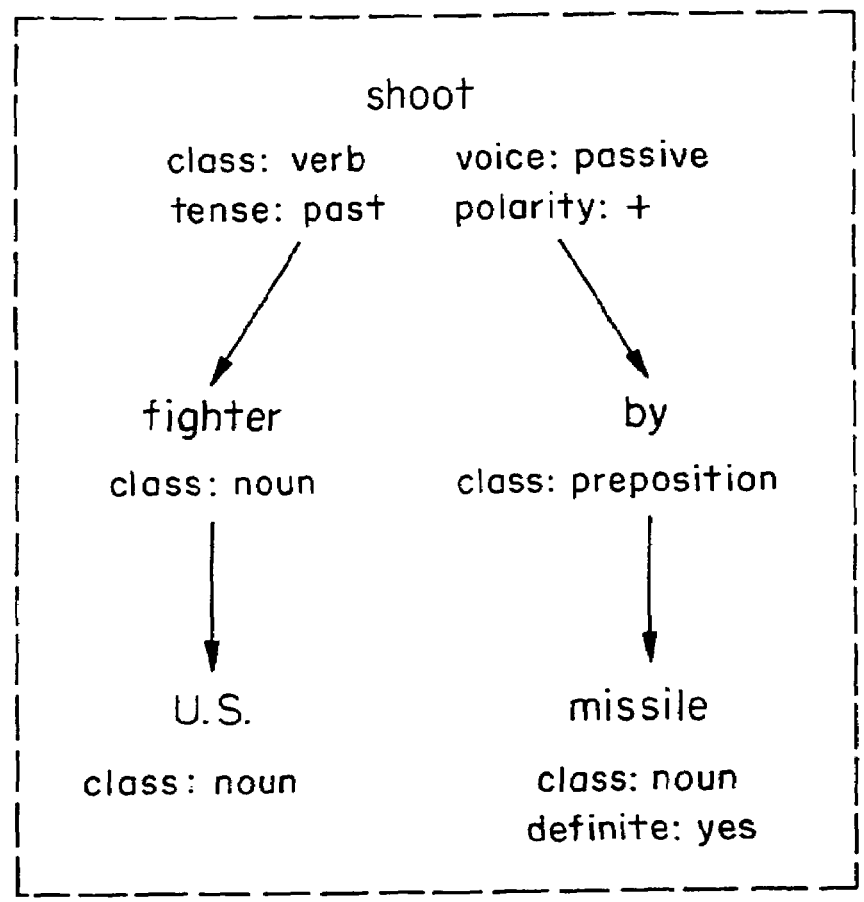
FIG. 3 is a pictorial diagram of a DSYNT tree structure for an exemplary sentence.

FIG. 2 is a flow chart which further illustrates steps that can be performed in connection with phrase intersection processing of step 120. The selected phrases are grammatically parsed and represented in a tree structure, such as a DSYNT tree diagram, which is generally known in the art. An example of such a diagram is illustrated in FIG. 3. The parse trees can be generated by a conventional grammatical parser, such as Collin's parser. The DSYNT tree structure is a way of representing the constituent dependencies resulting from a predicate-argument sentence structure. In the tree structure, each non-auxiliary word in the sentence has a node which is connected to its direct dependents. Grammatical features of each word are also stored in the node. To facilitate subsequent comparisons, words in the nodes are kept in their canonical form.

Returning to FIG. 2, those trees which have root nodes which are verbs are selected and used as the basis for comparison. Each such verb based tree is compared against the other trees derived from the sentences extracted from the documents in the collection (step 220). A comparison is made to determine if two nodes are identical (step 230). If two nodes are identical, those nodes are added to an output tree (step 235) and the nodes are evaluated to determine if there are further nodes descending from the root node (step 240). Such further nodes are referred to as children nodes. If children nodes are present (step 245), the comparison in step 230 is repeated for each of child node. If the analysis of the children nodes is complete at step 240, a determination is made as to whether the trees with common root nodes represent a phrase intersection (step 250). For example, if there is commonality in the root node and at least two children nodes of that root node, that phrase can be deemed complete and added to a phrase intersection table (step 255). If no phrase intersection is detected at step 250, the next parent node is selected for processing (step 260) and control returns to step 230.

Returning to step 230, if two nodes are not identical, it is still possible for the nodes to be equivalent. To make this determination, the present method employs a set of paraphrasing rules to evaluate the nodes (step 265). Paraphrasing, which can be broadly defined as alternative ways a human speaker can choose to "say the same thing" by using linguistic knowledge, generally occurs at a "surface" level, e.g., it is achieved by using semantically related words and syntactic transformations.

In the case of a set of related documents, theme sentences of the documents will generally be close semantically. This limits the scope of different paraphrasing types to be evaluated. From an analysis of paraphrasing patterns evaluated through themes of a training corpus derived from TDT, the following non-exhaustive set of paraphrasing categories have been found to occur with the greatest frequency:

1. ordering of sentence components: "Tuesday they met . . . " and "They met . . . . Tuesday";
2. main clause vs. a relative clause: " . . . a building was devastated by the bomb" and " . . . a building, devastated by the bomb";
3. realization in different syntactic categories, e.g., classifier vs. apposition: "Palestinian leader Arafat" and "Arafat, Palestinian leader", "Pentagon speaker" and "speaker from the Pentagon";
4. change in grammatical features: active/passive, time, number. " . . . a building was devastated by the bomb" and " . . . the bomb devastated a building";
5. omission of an empty head: "group of students" and "students";
6. transformation from one part of speech to another: "building devastation" and " . . . building was devastated"; and
7. using semantically related words such as synonyms: "return" and "alight", "regime" and "government".

The categories presented are used as paraphrasing rules by the present methods. The majority of these categories, such as ordering, can be fully implemented in an automatic way. However, some of the rules can be only approximated to a certain degree in an automated system. For example, identification of similarity based on semantic relations between words depends on the scope of coverage of the thesaurus employed. Word similarity can be established using relationships such as synonymy, hyponymy/hypemymy, and meronymy/holonymy which are detectable using the WordNet language database which is described in the article "WordNet: A lexical Database for English", by G. A. Miller, Communications of the ACM, Vol. 38, No. 11. pp. 39-41, November 1995.

If any of the included paraphrasing rules are satisfied for non-identical nodes, the nodes are deemed equivalent (step 270). Equivalent nodes are added to the output tree (step 235) and processed in the same manner as identical nodes. If no paraphrasing rule is applicable to non-identical nodes, there is no phrase intersection with the current tree (step 280).

In addition to phase intersection processing, which compares phrases for similarity, it is also desirable to perform phrase divergence processing (step 130), which compares selected phrases for differences. Phrase divergence may indicate a critical change in the course of events through a set of related documents and would be worthy of inclusion in a summary. For example, a collection of articles regarding a plane crash could begin with a focus on the passengers as "survivors" and later refer to "casualties," "victims," "bodies" and the like, which signify a turning point in the events described by the documents. WordNet can also be used in phrase divergence processing by evaluating focus relationships such antonymy (e.g., "happiness is opposite to sadness").

Figure 4:
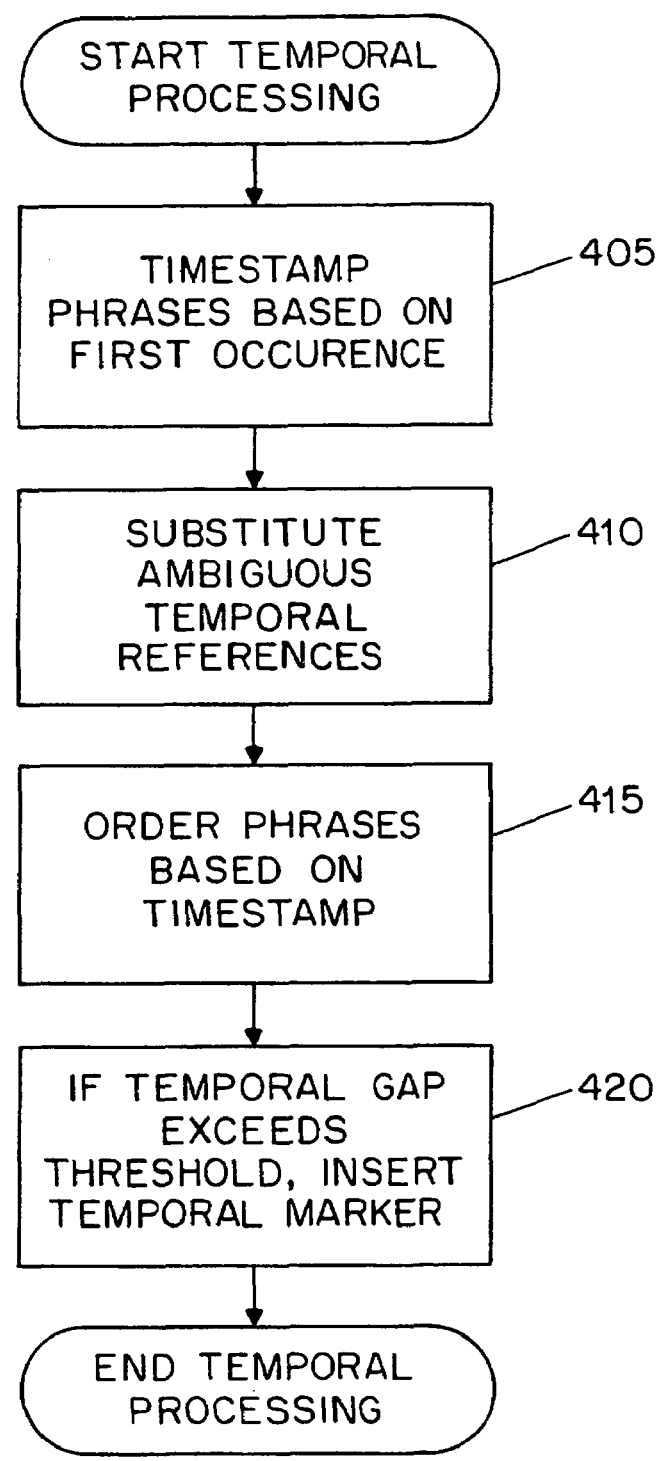
FIG. 4 is a flow chart of a temporal processing operation in accordance with the system operation of FIG. 1.

Once phrases are selected from the documents for the summary, temporal processing can be performed to sequence the phrases and eliminate ambiguous temporal references. The flow chart of FIG. 4 illustrates an overview of the temporal processing operations performed in the present methods. Using a rule that an event is assumed to have occurred on the day that it is first reported, a time stamp can be applied to the selected phrases based on the earliest occurrence of the phrase in the collection of documents (step 405). In certain cases, phrases may include ambiguous temporal references, such as today, yesterday, etc. In this case, such ambiguous references can be replaced by a date certain reference, such as by changing "Yesterday it was reported . . . " to "On Jan. 2, 2000, it was reported . . . ". Such substitutions, which are performed in step 410, can be implemented using the Emacs "calendar" package.

The extracted phrases can then be ordered in accordance with the assigned date stamp (step 415). In certain cases, a large temporal gap may exist between consecutive phrases. In such a case, if the gap exceeds a threshold, such as two days, a temporal marker can be inserted between the phrases to indicate this gap in time (step 420). This may be significant, for example, in the case of a collection of news articles where the gap in time can also correspond to a change in focus in the articles.

With the phrases selected and sorted in temporal order, sentence generation (step 150) can be performed to synthesize a coherent summary. Sentence generation involves two major operations. First, the DSYNT representation of the phrases to be used in sentence generation are mapped to the appropriate syntax of a selected language generation engine. Then, the language generation engine is operated to arrange the phrases into coherent sentences. A suitable language generation engine is FUF/SURGE, which is available from Columbia University, New York, N.Y., as well as from Ben Gurion University, Department of Computer Science, Beer-Sheva, Israel. The acronym FUF stands for Functional Unification Formalism interpreter and the acronym SURGE stands for syntactic realization grammar for text generation. The input specification for the FUF/SURGE engine includes a semantic role, circumstantial, which itself includes a temporal feature. The inclusion of the semantic attributes enables FUF/SURGE to perform various paraphrasing operations to the input phrases to improve the resulting sentences.

Figure 5:
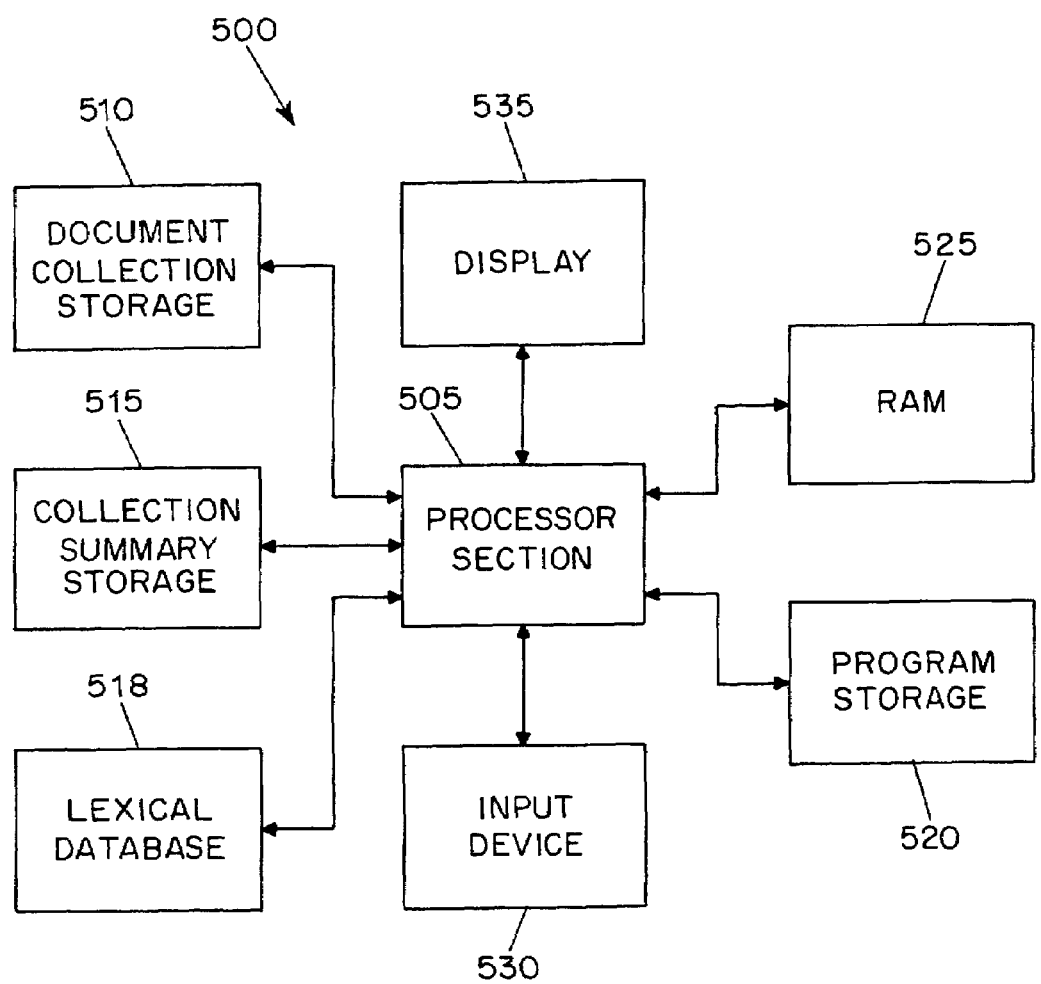
FIG. 5 is a simplified block diagram of an embodiment of the present multiple document summarization system.

FIG. 5 is a simplified block diagram of a multiple document summarization system in accordance with the present invention. The system 500 includes a processor section 505 wherein the processing operations set forth in FIG. 1 are performed. The system also includes non-volatile storage coupled to the processor section 505 for document storage 510, collection summary storage 515, lexical database storage 518 and program storage 520. Generally these storage systems are read/write data storage systems, such as magnetic media and read/write optical storage media. However, the document collection storage may take the form of read-only storage, such as a CD-ROM storage device. The system further includes RAM memory 525 coupled to the processor section for temporary storage during operation. The system 500 will generally include one or more input device 530 such as a keyboard, digitizer, mouse and the like, which is coupled to the processor section 505. Similarly, a conventional display device 535 is generally provided which is also operatively coupled to the processor section.

The particular hardware embodiment is not critical to the practice of the present invention. Various computer platforms and architectures can be used to implement the system 500, such as personal computers, workstations, networked computers, and the like. The functions described in the system can be performed locally or in a distributed manner, such as over a local area network or the Internet. For example, the document collection storage 510 may be at a remote archive location which is accessed by the processor section 505 via a connection to the Internet.

Although the present invention has been described in connection with specific exemplary embodiments, it should be understood that various changes, substitutions and alterations can be made to the disclosed embodiments without departing from the spirit and scope of the invention as set forth in the appended claims.

The invention claimed is:

1. A method for generating a summary of a plurality of related documents available in computer readable media in a collection comprising:
    extracting phrases having focus elements from the plurality of documents;
    performing phrase intersection analysis on the extracted phrases to generate a phrase intersection table;
    performing temporal processing by applying a timestamp to the phrases in the phrase intersection table and ordering the phrases based on the timestamps; and
    generating a summary of the plurality of related documents available in computer readable media by performing sentence generation using the phrases in the phrase intersection table which have been subject to said temporal processing.

2. The method of generating a summary as defined by claim 1, wherein the phrase intersection analysis comprises:
    representing the phrases in tree structures having root nodes and children nodes;
    selecting those tree structures with verb root nodes;
    comparing the selected root nodes to the other root nodes to identify identical nodes;
    applying paraphrasing rules to non-identical root nodes to determine if non identical nodes are equivalent; and
    evaluating the children nodes of those tree structures where the parent nodes are identical or equivalent.

3. The method of claim 2, wherein the tree structure is a DSYNT tree structure.

4. The method of claim 2, wherein the paraphrasing rules are selected from the group consisting of ordering of sentence components, main clause versus a relative clause, different syntactic categories, change in grammatical features, omission of an empty head, transformation of one part of speech to another, and semantically related words.

5. The method of claim 1, wherein the temporal processing further includes:
   wherein the time stamp applied to the phrases in the phrase intersection table is based on a first occurrence of the phrase in the collection;
   substituting date certain references for ambiguous temporal references;
   and
   inserting a temporal marker if a temporal gap between phrases exceeds a threshold value.

6. The method of claim 1, further comprising a phrase divergence processing operation.

7. The method of claim 1, wherein the sentence generation includes mapping phrases to an input format of a language generation engine and operating the language generation engine.

8. A system for generating a summary of a plurality of related documents in a collection comprising:
   a storage device for storing the documents in the collection;
   a lexical database; and
   a processing subsystem, the processing subsystem being operatively coupled to the storage device and the lexical database, the processing subsystem being programmed to access the plurality of related documents in the storage device and generate a summary thereof by;
   using the lexical database to extract phrases having focus elements from the plurality of documents;
   performing phrase intersection analysis on the extracted phrases to generate a phrase intersection table;
   performing temporal processing by applying a timestamp to the phrases in the phrase intersection table and ordering the phrases based on the timestamps; and
   performing sentence generation using the phrases in the phrase intersection table which have been subject to said temporal processing.

9. The system for generating a summary as defined by claim 8, wherein the phrase intersection analysis processing further comprises:
   representing the phrases as data structures having root nodes and children nodes;
   selecting those data structures with verb root nodes;
   comparing the selected root nodes to the other root nodes to identify identical nodes;
   applying paraphrasing rules to non-identical root nodes to determine if non identical nodes are equivalent; and
   evaluating the children nodes of those tree structures where the parent nodes are identical or equivalent.

10. The system of claim 9, wherein the data structure is a DSYNT tree structure.

11. The system of claim 9, wherein the paraphrasing rules are selected from the group consisting of ordering of sentence components, main clause versus a relative clause, different syntactic categories, change in grammatical features, omission of an empty head, transformation of one part of speech to another, and semantically related words.

12. The system of claim 8, wherein the temporal processing further includes:
   wherein the time stamp applied to the phrases in the phrase intersection table is based on a first occurrence of the phrase in the collection;
   substituting date certain references for ambiguous temporal references;
   and
   inserting a temporal marker if a temporal gap between phrases exceeds a threshold value.

13. The system of claim 8, further comprising a phrase divergence processing operation.

14. The system of claim 8, wherein the processing subsystem includes a language generation engine and wherein sentence generation includes mapping phrases to an input format of the language generation engine and then operating the language generation engine.

15. The system of claim 8, wherein the storage device for storing the documents in the collection is remotely located from the processing subsystem.

16. A computer readable media for programming a computer system to perform a method of generating a summary of a plurality of related documents in a collection comprising:
   extracting phrases having focus elements from the plurality of documents;
   performing phrase intersection analysis on the extracted phrases to generate a phrase intersection table;
   performing temporal processing by applying a timestamp to the phrases in the phrase intersection table and ordering the phrases based on the timestamps; and
   generating a summary of the plurality of related documents by performing sentence generation using the phrases in the phrase intersection table which have been subject to said temporal processing.

17. The computer readable media of claim 16, wherein the phrase intersection analysis comprises:
   representing the phrases in tree structures having root nodes and children nodes;
   selecting those tree structures with verb root nodes;
   comparing the selected root nodes to the other root nodes to identify identical nodes;
   applying paraphrasing rules to non-identical root nodes to determine if non identical nodes are equivalent; and
   evaluating the children nodes of those tree structures where the parent nodes are identical or equivalent.

18. The computer readable media of claim 17, wherein the tree structure is a DSYNT tree structure.

19. The computer readable media of claim 17, wherein the paraphrasing rules are selected from the group consisting of ordering of sentence components, main clause versus a relative clause, different syntactic categories, change in grammatical features, omission of an empty head, transformation of one part of speech to another, and semantically related words.

20. The computer readable media of claim 16, wherein the temporal processing further includes:
   wherein the time stamp applied to the phrases in the phrase intersection table is based on a first occurrence of the phrase in the collection;
   substituting date certain references for ambiguous temporal references;
   and
   inserting a temporal marker if a temporal gap between phrases exceeds a threshold value.

21. The computer readable media of claim 16, further comprising a phrase divergence processing operation.

22. The computer readable media of claim 16, wherein the sentence generation includes mapping phrases to an input format of a language generation engine and operating the language generation engine.

* * * * *